(12) United States Patent
Clement

(10) Patent No.: US 11,781,325 B2
(45) Date of Patent: *Oct. 10, 2023

(54) FLOOR PANEL FOR FORMING A FLOOR COVERING AND METHOD FOR MANUFACTURING SUCH FLOOR PANELS

(71) Applicant: Flooring Industries Limited, SARL, Bertrange (LU)

(72) Inventor: Benjamin Clement, Waregem (BE)

(73) Assignee: Flooring Industries Limited, SARL, Bertrange (LU)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,473

(22) Filed: Jun. 28, 2022

(65) Prior Publication Data

US 2022/0325532 A1 Oct. 13, 2022

Related U.S. Application Data

(63) Continuation of application No. 17/165,387, filed on Feb. 2, 2021, now Pat. No. 11,401,719, which is a continuation of application No. 16/598,359, filed on Oct. 10, 2019, now Pat. No. 10,941,579, which is a continuation of application No. 15/851,210, filed on Dec. 21, 2017, now Pat. No. 10,465,391, which is a continuation of application No. 15/125,993, filed as application No. PCT/IB2015/051850 on Mar. 13, 2015, now Pat. No. 9,885,188.

(60) Provisional application No. 61/955,379, filed on Mar. 19, 2014.

(51) Int. Cl.
| | |
|---|---|
| *B32B 7/12* | (2006.01) |
| *E04F 15/10* | (2006.01) |
| *B44C 5/04* | (2006.01) |
| *B32B 38/00* | (2006.01) |
| *B29C 65/48* | (2006.01) |
| *B29C 65/00* | (2006.01) |
| *B32B 5/02* | (2006.01) |
| *B32B 27/12* | (2006.01) |
| *B32B 27/30* | (2006.01) |
| *B32B 37/10* | (2006.01) |
| *B32B 37/12* | (2006.01) |
| *B41M 5/00* | (2006.01) |

(52) U.S. Cl.
CPC ............ *E04F 15/105* (2013.01); *B29C 65/48* (2013.01); *B29C 66/45* (2013.01); *B32B 5/022* (2013.01); *B32B 7/12* (2013.01); *B32B 27/12* (2013.01); *B32B 27/304* (2013.01); *B32B 37/10* (2013.01); *B32B 37/12* (2013.01); *B32B 38/145* (2013.01); *B44C 5/04* (2013.01); *B32B 2250/24* (2013.01); *B32B 2255/10* (2013.01); *B32B 2255/26* (2013.01); *B32B 2262/101* (2013.01); *B32B 2307/412* (2013.01); *B32B 2307/414* (2013.01); *B32B 2307/554* (2013.01); *B32B 2327/06* (2013.01); *B32B 2419/04* (2013.01); *B32B 2471/00* (2013.01); *B41M 5/00* (2013.01)

(58) Field of Classification Search
CPC . E04F 15/10; B32B 7/12; B32B 27/12; B32B 37/12; B32B 38/145
See application file for complete search history.

(56) References Cited

U.S. PATENT DOCUMENTS

| | | | |
|---|---|---|---|
| 6,514,624 B2 | 2/2003 | Takemoto | |
| 9,885,188 B2 * | 2/2018 | Clement | ................. B32B 37/12 |
| 10,465,391 B2 * | 11/2019 | Clement | ................... B44C 5/04 |
| 10,941,579 B2 * | 3/2021 | Clement | ............... B32B 38/145 |
| 11,401,719 B2 * | 8/2022 | Clement | ................. B32B 27/12 |
| 2002/0189183 A1 | 12/2002 | Ricciardelli | |
| 2007/0283648 A1 | 12/2007 | Chen | |
| 2009/0031662 A1 | 2/2009 | Chen et al. | |
| 2011/0012954 A1 | 1/2011 | Brown et al. | |
| 2011/0167744 A1 | 7/2011 | Whispell et al. | |
| 2012/0249705 A1 | 10/2012 | Aoki et al. | |
| 2014/0144583 A1 | 5/2014 | Hakansson et al. | |
| 2015/0210055 A1 | 7/2015 | Pervan | |

FOREIGN PATENT DOCUMENTS

| | | | |
|---|---|---|---|
| WO | 2009066081 | A1 | 5/2009 |
| WO | 2011077311 | A2 | 6/2011 |
| WO | 2011141849 | A2 | 11/2011 |
| WO | 2011141850 | A2 | 11/2011 |
| WO | 2013030686 | A2 | 3/2013 |
| WO | 2013179260 | A1 | 12/2013 |
| WO | 2014084787 | A1 | 6/2014 |
| WO | 2016146565 | A1 | 9/2016 |

* cited by examiner

*Primary Examiner* — Elizabeth E Mulvaney
(74) *Attorney, Agent, or Firm* — Capitol City Tech Law

(57) ABSTRACT

A method for manufacturing a floor panel having a substrate and a top layer. The top layer may have a decorative layer that includes a digital print and a transparent or translucent wear layer. The method may involve providing the substrate with the digital print by jetting one or more inks from a set of inks using a digital inkjet printer. The ink may include a binding agent and/or a primer or adhesion layer may be provided between the digital print and the transparent or translucent wear layer. The digital print may be performed directly on the substrate. The transparent or translucent wear layer may be laminated on top of the printed substrate.

18 Claims, No Drawings

FLOOR PANEL FOR FORMING A FLOOR COVERING AND METHOD FOR MANUFACTURING SUCH FLOOR PANELS

This application is a continuation of U.S. patent application Ser. No. 17/165,387 filed on Feb. 2, 2021, which is a continuation application of U.S. patent application Ser. No. 16/598,359 filed Oct. 10, 2019 (issued as U.S. Pat. No. 10,941,579), which is a continuation application of U.S. patent application Ser. No. 15/851,210 filed Dec. 21, 2017 (issued as U.S. Pat. No. 10,465,391), which is a continuation application of U.S. patent application Ser. No. 15/125,993 filed Sep. 14, 2016 (issued as U.S. Pat. No. 9,885,188), which is a US National Phase Application of International Application No. PCT/162015/051850 filed Mar. 13, 2015, which claims priority under 35 USC 119(e) to U.S. provisional patent application No. 61/955,379 filed on Mar. 19, 2014, the entire contents of all six of which are incorporated herein by reference.

BACKGROUND

1. Field

This invention primarily relates to a floor panel for forming a floor covering, as well as to a floor covering formed from such floor panels, as well as to a method for manufacturing such floor panels. More particularly, it can also be applied with other panels than floor panels, thus, for forming other coverings than floor coverings.

2. Related Art

More particularly, the invention relates to a panel, more particularly a floor panel of the type which substantially is made of synthetic material and more specifically of supple or soft synthetic material. Such panel may comprise coupling parts on at least two opposite edges, said coupling parts being of the type allowing to couple two of such panels to each other. Floor panels which are designed in this manner are known, amongst others, from documents US 2002/0189183 and WO 2011/077311.

SUMMARY

As already stated herein above, the present invention primarily shows its advantages when being applied in floor panels which substantially are made of supple or soft synthetic material, or in other words, in supple panels.

By supple panels, panels are meant which, when the panels, in the case of a rectangular panel having a width of, for example, less than 50 centimeters, are clamped on one of both short sides of the panel and thereby protrude over a length of 100 centimeters and are not supported, will bend under the influence of their own weight, wherein such bending at the height of the free end is least minimum 10 centimeters in respect to the clamped end. For this bending, a bending time of 10 seconds is respected and wherein the panel starts from a flat horizontal position.

The present invention further shows its advantages best when being applied with floor panels of the type which generally is indicated by the English term of "Resilient floor panels". To this type of floor panels, amongst others, belongs a vinyl panel, more particularly a so-called vinyl tile, and in particular a panel of the so-called LVT type ("Luxury Vinyl Tile"). Herein, this mostly relates to panels of so-called soft PVC (Polyvinyl Chloride), which usually is manufactured of PVC in which plasticizers or the like are incorporated. Preferably, at least 12 percent by weight of plasticizer are applied in the PVC mix, wherein possible fillers, such as chalk, are not taken into consideration.

According to the invention, the floor panel comprises a decorative upper side. Preferably, the floor panel substantially is composed of a substrate and a top layer. This top layer may serve, amongst others, as a decorative layer and/or wear layer. The top layer as such may also consist of a plurality of layers, such as, for example, a decorative layer and a wear layer.

According to the invention, said top layer comprises at least a decorative layer in the form of a print.

From document WO 2009/066081, it is known to provide wall-to-wall carpeting with a decorative digital print. This print is provided on an enclosed glass fiber fleece, which is provided with an ink reception layer. The adherence of the transparent vinyl wear layer on the printed glass fleece may not be optimum.

Generally, the invention relates to alternative floor panels, floor coverings and methods. In particular, the invention according to preferred embodiments aims at offering a solution to possible delamination between a thermoplastic wear layer and a digital print, or at least at restricting the risk of delamination.

The invention is defined in the attached claims and relates to a floor panel for forming a floor covering, wherein this floor panel substantially consists of synthetic material; wherein this floor panel comprises a decorative upper side, with the characteristic that the decorative upper side is formed at least by a decorative layer which comprises a digital print or consists of a digital print.

Preferably, said digital print is provided on a thermoplastic film, preferably a PVC film, and still better a PVC film of the "rigid" type, namely with less than 10% or less than 5% plasticizer, or even without any plasticizer. As the digital print is provided on a thermoplastic film, this can be incorporated in the floor panel in a sustainable manner. Herein, a low content of plasticizer is advantageous as, with a possible heat treatment or hot press treatment thereof a better dimensional accuracy can be maintained.

Preferably, the floor panel is a vinyl panel, more particularly a so-called vinyl tile, and in particular a panel of the so-called LVT type ("Luxury Vinyl Tile"), also called heterogeneous vinyl tile.

Preferably, the digital print comprises digitally provided UV-based or solvent-based inks, which preferably are pigmented. By using these inks, a heat treatment for drying the inks can be excluded, such that the printed material is less susceptible to dimensional alterations. Moreover, the inventor has found that such ink will smear less than, for example, water-based inks, even when no ink reception layer is applied. However, it is not excluded that the invention would be put into practice with water-based inks, which then preferably are pigmented, too. When using water-based inks, preferably an ink reception layer is used on the material to be printed. The use of pigmented inks in general leads to better lightfastness and a higher obtainable resolution of the printed patterns.

Preferably, the floor panel comprises at least a translucent or transparent wear layer, which is provided above said print. Preferably, for providing the translucent or transparent wear layer, use is made of a primer or adhesion layer, wherein this primer or adhesion layer is provided between said print and the wear layer, more particularly on the digitally provided inks of the print. Herein, said primer or adhesion layer preferably is chosen from the series consisting of polyurethane hotmelt, polyamide hotmelt, vinyl chloride vinyl acetate (VC-VAC) copolymer and water-based primer, wherein in the case of a water-based primer, preferably use is made of an aqueous dispersion of elastomeric polyester-polyurethane polymer. According to another possibility, for the primer or adhesion layer use is made of a heat-sensitive 2K glue, for example, of a two-component polyurethane glue system, preferably based on aliphatic isocyanates and an hydroxy, carboxy or amino functionalized polyester or polyether component.

The thermoplastic wear layer preferably relates to a transparent PVC layer which is adhered to the underlying layers of the floor panel, in particular with the digital print, namely bonded at the mutual contact surface, by means of a hot press treatment. This lamination of the PVC layer on the digital print can be performed, for example, at a temperature of approximately 130-170° C., and still better of approximately 150 to 170° C.

The inventor has found that when no primer or adhesion layer is applied between the print and the transparent PVC layer, problems with delamination may arise due to a lack of adherence between the ink and the PVC of the transparent layer. In the case of UV-based ink, this is caused by the presence of surface-active agents (surfactants), moisturizers (wetting agents) and silicones in the ink, and by the fact that UV ink does not melt during lamination. In the case of solvent-based ink and water-based ink, this is caused by a low content of binding agents and by the fact that the solvent ink also does not melt during lamination. Increasing the binding agent in the ink leads to an ink which is more difficult to jet by an inkjet printer, unless cutbacks are made in the resolution of the print.

In the case that for the primer or adhesion layer, polyurethane hotmelt or polyamide hotmelt is used, this is preferably provided on the underside of the transparent wear layer. Usually, this is thicker than the possible printed film and thus more resistant against the heat required for providing a hotmelt layer. Preferably, a thermoplastic transparent film is applied, for example, a PVC film having a thickness of at least 150 micrometers and still better of 300 micrometers or more. From a practical point of view, such primer or adhesion layer best is applied with one or more rollers on the transparent wear layer or the digital print.

In the case that for the primer or adhesion layer VC-VAC (Vinyl chloride-vinyl acetate) copolymer is applied, this can be provided on the digital print, for example, on the digitally printed film, as well as be coated on the underside of the wear layer or transparent film. Possibly, such a primer can be used which also has a hydroxy or carboxy functionality. In general, in respect to VC-VAC it can be noted that this agent is also applied as a binding agent in inks for digital printing, for example, in UV-based or solvent-based inks. However, the content of VC-VAC in digital ink is restricted. Too high a content of VC-VAC in the ink would increase the viscosity of the ink, such that the latter cannot be applied in the print head of inkjet printers without lowering the resolution. An extra quantity of binding agent or VC-VAC as a primer might also be provided by applying an extra, preferably colorless, ink in, underneath and/or on the print, which, for example, as such consists of a CMYK color image. An ink without pigment as such is less viscous, such that a higher content of binding agent or VC-VAC can be applied for obtaining the limiting viscosity of the respective print head. For applying such ink, it is also possible to use a print head with a larger nozzle opening in comparison to the print heads jetting the basic color inks. This cutback in respect to resolution is of less importance with colorless ink. For example, the colorless ink might be provided by means of a so-called valve-jet.

In case that a water-based primer is used for the primer or adhesion layer, preferably a dispersion of elastomeric polyester-polyurethane polymer is applied, for example, with a dry matter content of 30 percent by weight or more, for example, with a dry matter content of 50 percent by weight or approximately 50 percent by weight. Such water-based primer combines a low glass transition temperature or Tg with low viscosity, such that it possibly may be jetted by means of the usual print heads of an inkjet printer. Moreover, this printer can be activated at a temperature between 130° C. and 170° C., or better between 150 and 170° C., such that it can become active when laminating the wear layer. The inventor has found that a coating of 10-60 grams per square meter, and still better between 20 and 40 grams per square meter of wet weight of the primer, offers a good adherence. In a test with 40 grams per square meter wet weight and dried by hot air of 80° C., a perfect adherence was obtained during laminating of the digital print with a transparent PVC wear layer.

Said water-based dispersion of elastomeric polyester-polyurethane polymer can be supplemented further by a water-based polyester dispersion with hydroxy, amino and/or carboxy functional groups, such as, for example, by a dispersion of dimethyl amino ethanol. Such dispersion can be added with a ratio of 1:9 to 9:1 in respect to the initial water-based primer. The inventor has found that such composed primer can give an extra boost to the intercoat adhesion. In order to still further improve the adhesion between ink, primer and PVC as well as the internal cohesion of the primer, also a percentage of isocyanate may be added to the water-based primer. Preferably, this relates to an aliphatic isocyanate. Such type is little or not susceptible to yellowing and is transparent. Preferably, 0.1 to 30 percent by weight of isocyanate is added to the water-based primer, still better between 1 and 15% or between 2 and 8%.

Further, the water-based primer possibly may also comprise anti-foaming agents, levelling agents, anti-blocking agents and/or humidifying agents (wetting agent).

Such water-based primer can be applied in different manners, for example, by means of jetting, either with a piezo or valve print head, by means of rolling, either by means of anilox rollers or dosing rollers, or by means of slot coating.

The primer or adhesion layer, in particular in the case of VC-VAC copolymer, can be provided underneath the print as well as above the print. Such sandwich construction leads to a superior adherence of the print in the floor panel.

Generally, in respect to the digital printing of thermoplastic films, such as PVC films, it is also noted that the inventor has found during his tests that it can be assumed that the amount of binding agent in the ink, more particularly in solvent-based ink and water-based ink, is the key to success for a good lamination with the transparent PVC wear layer. The amount of binding agent in an inkjet ink is limited on account of the viscosity of the ink and the jet behavior coupled thereto. Namely, increasing the concentration of binding agent without negatively influencing the jet behavior is not so evident.

Thus, the present invention more in general relates to:
An ink set, for example CMYK, preferably solvent-based inks, water-based inks or UV-based inks, wherein these inks comprise binding agents, for example, VC-VAC copolymer or polymer latexes, either acrylates or urethane components. Preferably, the inks show an amount of binding agent which is as high as possible, such that an optimum subsequent lamination with the wear layer can be obtained with an acceptable jet behavior. An amount of binder or binding agent of at least 2, at least 8 or even at least 10 percent by weight of the liquid ink seems viable. Due to the jet behavior, the amount of binding agent preferably should be kept lower than 20 percent by weight; and possibly providing additional binder or binding agent on the ink in order to further improve the subsequent lamination to the wear layer.

As aforementioned, possibly an inkjet print head may be applied for providing the extra binding agent. For example, an additional fifth or sixth spot color channel in the printer may be used for jetting a colorless (pigmentless) ink with an increased concentration of binder or binding agent. Herein, it is to be noted that the viscosity of an ink is determined by pigment and binder or binding agent. When omitting the pigment, thus also the amount of binding agent can be increased, namely up to more than 8 or more than 10 percent by weight.

Further, it is also noted that the binder, as aforementioned, as such can be applied at a lower resolution and that printing quality or jet quality play a less important role. Thus, print heads with larger nozzles are possible for this purpose. Due to the larger nozzle openings, less problems with viscosity will arise.

Further, it is noted that by providing a decorative layer in the form of a print, the appearance of the panel, or the appearance of the decorative surface, can be chosen freely and can be given any desired decorative character. For example, said decorative layer may relate to a printed film, more particularly a printed thermoplastic film. Preferably, above the printed film there is a wear layer on the basis of thermoplastic material, for example, on the basis of PVC or soft PVC. Applying a printed film, more particularly a printed thermoplastic film, together with a thermoplastic wear layer offers advantages in respect to the occurrence of wear in such panels. To wit, when coupling a plurality of such panels to each other, sometimes minor height differences may occur between the decorative upper sides of two coupled panels. In such cases, the top layer is subjected to wear in particular at the edge areas. Using a thermoplastic film and idem wear layer results in limiting such wear, on account of the fact that it can be made somewhat compressible, for example, as such may consist of PVC or soft PVC.

As aforementioned, the top layer preferably comprises at least a translucent or transparent wear layer. According to a possible embodiment, said wear layer is present in the form of a transparent thermoplastic wear layer. Preferably, said wear layer is free from corundum particles or other wear-resistant particles.

The top layer can be finished with a lacquer layer, which is provided as a liquid layer on said wear layer and/or decorative layer and subsequently is solidified. Preferably, this relates to a lacquer layer which can be solidified by means of UV light. Preferably, a lacquer layer is provided on top of the possible wear layer.

Preferably, the floor panel according to the invention relates to a floor panel, wherein this floor panel, or at least the substrate of the floor panel, substantially is constructed of a thermoplastic material, preferably of a soft thermoplastic material. There are various possibilities for constructing such floor panel, and two possibilities thereof will be presented below.

According to a first and most preferred possibility, the floor panel, or anyhow at least the substrate of the floor panel, is constructed of a plurality of material layers, preferably layers of thermoplastic material, more particularly of soft thermoplastic material. The different layers of thermoplastic material of the substrate possibly may enclose between them one or more glass fiber layers, such as a glass fiber cloth or glass fiber fleece. According to the most preferred embodiment, the substrate consists of two soft PVC layers, which between them enclose a glass fiber layer, preferably a glass fiber fleece or so-called "non-woven". Preferably, these layers of the substrate further also comprise fillers, such as an amount of chalk. Preferably, the panels have a density between 1250 and 2250 kilograms per cubic meter.

According to a second possibility, the substrate of the floor panel is constructed of a single layer of thermoplastic material, more particularly soft thermoplastic material. This may relate, for example, to a single layer of so-called WPC (Wood Plastic Composite).

DESCRIPTION OF NON-LIMITING EMBODIMENTS

According to a preferred embodiment, the floor panel, or anyhow at least the substrate of the floor panel, substantially is composed of polyvinyl chloride, more particularly of soft polyvinyl chloride, namely PVC containing plasticizers. Preferably, use is made of PVC obtained from a PVC homopolymer of suspension quality having a K value between 50 and 80 or still better between 60 and 67.

It is noted that the floor panel of the invention preferably comprises a substrate which contains plasticizers. According to a specific embodiment, this relates to a floor panel wherein this floor panel comprises a substrate containing plasticizers of the type DINP or DINCH, more particularly with a mass ratio of 20% to 40%, possible filler material not taken into account.

According to a variant, this relates to a floor panel wherein this floor panel is substantially free from plasticizers.

As aforementioned, the floor panel of the invention, apart from the synthetic material, may also comprise a filler material, preferably chalk or a chalk-like material. Applying a filler material in particular serves for reducing the amount of synthetic material required and/or for rendering the panel heavier. In some cases, a heavier panel has the advantage that the panel is more stable and/or remains better at its location during placement and/or after installation.

Preferably, the panel of the invention relates to a rectangular floor panel, either oblong or square. Preferably, such floor panel is provided with coupling parts on at least a first pair of opposite edges, which coupling parts are of the type allowing to couple two of such floor panels to each other by means of a downward movement of one floor panel in respect to the other, and/or are of the type allowing to couple two of such floor panels to each other along the respective edges by means of a turning movement. Preferably, said coupling parts then provide for a vertical and horizontal locking. Preferably, the coupling parts are made in one piece with the floor panel.

The present invention is particularly suited, however, not in a restrictive manner, for thin floor panels, more particularly for floor panels having a thickness of 2 millimeters through 6 millimeters and more particularly of 3 millimeters through 5 millimeters.

According to a possible embodiment of the present invention, the floor panel shows the following characteristics:

the floor panel substantially is composed of, on the one hand, a core or a substrate, wherein this core or this substrate is constructed of material forming the basic material of the floor panel, and, on the other hand, of a top layer, in other words, a surface layer, which top layer as such may or may not be composed of a plurality of layers;

the basic material of the floor panel, of which said core is composed, substantially comprises soft thermoplastic material, wherein this thermoplastic material possibly contains a filler;

and said top layer comprises a printed thermoplastic film and a transparent thermoplastic wear layer, wherein said transparent thermoplastic wear layer is thinner than 0.85 millimeters and is free from fillers.

It is clear that the invention also relates to a floor covering which is composed of floor panels as described herein above.

The panel or floor panel of the invention preferably comprises at least one reinforcement layer, preferably formed of fibers, more particularly reinforcement fibers, such as glass fibers. The use of such reinforcement layer, and in particular a reinforcement layer with fibers, increases the dimensional stability of the floor panels. This is of particular importance with floor panels for non-glue installation, as by the application of fibers the expansion and/or shrinkage of the panel under the influence of the temperature differences can be reduced considerably. Hereby, the risk can be further minimized that the coupled floor panels will separate from each other as a result of expansion and/or shrinkage. It is noted that the aforementioned reinforcement fibers may be present in various forms, such as also in the form of, for example, a cloth, a fleece or a net, more particularly, for example, a glass fiber cloth or a glass fiber fleece. Preferably, seen in cross-section of the panel, said fibers are applied in one or more horizontal layers. Preferably, at least one of said layers is situated at the height of said separate locking element. Hereby, the advantage is created that, seen from the point of view of connection features, the floor panel is maintained optimally dimensionally stable on the most critical level, namely at the location of the locking element.

In the case that a single reinforcement layer, for example, a single layer with fibers, is applied, this layer preferably is situated in the middle or approximately in the middle of the panel. In this manner, a symmetrical construction of the floor panel is obtained, which offers advantages in respect to the stability of the floor panel. According to a particularly preferred embodiment, two or more reinforcement layers are applied, which preferably are located at a distance from each other. In the case of two reinforcement layers, these, seen in cross-section, preferably are situated on both sides of the neutral line of the floor panel. Hereby, the advantage is obtained that bending forces can be counteracted in both directions. This is particularly advantageous with relatively supple floor panels which substantially are made of soft PVC.

The invention further also relates to a method for manufacturing floor panels or wall-to-wall floor coverings as described herein above, wherein this method comprises at least the following steps:

providing a print on a thermoplastic film by means of UV-based or solvent-based inks or water-based inks, which preferably are pigmented; preferably, a digital printing technique is applied, preferably inkjet printing.

providing a transparent or translucent wear layer on said print;

characterized in that between the print and the transparent or translucent wear layer, a primer or adhesion layer is provided. The primer or adhesion layer preferably is chosen from the series consisting of polyurethane hotmelt, polyamide hotmelt, vinyl chloride vinyl acetate (VC-VAC) and water-based primer. The water-based primer may be, for example, an aqueous dispersion of elastomeric polyester-polyurethane polymer. As mentioned above, a percentage of isocyanate can be added to the water-based primer for further improving the adhesion between the ink, primer and PVC and for improving the internal cohesion of the primer. It is clear that according to a variant, here, too, the also above-mentioned heat-sensitive 2K glue may be applied as a primer.

It is clear that this method preferably is applied for manufacturing the floor panels already described herein above and the preferred embodiments thereof.

According to a variant, the primers and adhesion layers of the present invention also can be applied with digital prints for manufacturing wall-to-wall floor coverings, such as heterogeneous vinyl floor coverings or so-called "cushion vinyl". In such floor coverings, also a transparent thermoplastic wear layer, for example, a PVC wear layer, is provided on a print. It is clear that according to this variant, the print, printing films, primers and wear layers can be applied in a similar manner as in the floor panels already mentioned above.

Further, it is also noted that the floor panels and wall-to-wall floor coverings preferably comprise at least the following components: a substrate of synthetic material, preferably a PVC-containing substrate, a digitally printed thermoplastic film, such as a PVC print film, a primer or adhesion layer, and a transparent wear layer, preferably a PVC wear layer, preferably also made as a film. Optionally, a polyurethane lacquer layer can be provided on the surface of the wear layer as well.

It is clear that according to the invention the print does not necessarily have to be provided on a white or uniformly colored print film. The print can also be performed directly on the substrate, possibly with the intermediary of preparative layers, such as plastisol coatings of a uniform, preferably white, color. According to another possibility, the print may also be performed on the underside of the transparent wear layer. Herein, this then relates to a so-called "reverse" print. Preferably, in such case a white or uniform layer or film is used, which, in the final floor panel or the floor covering, is located underneath the reversely printed transparent, for example, PVC layer, such that a certain opacity is obtained. In case of a reverse print, the primer or adhesion layer can be provided on the ink of the print or on the underlying opaque layer, such as on an underlying white PVC film.

Generally, it is noted that the transparent wear layer, whether now being printed in reverse or not, preferably substantially consists of PVC having a plasticizer content of 10% or less. Preferably, this relates to a transparent wear layer, which is applied as a film. However, it is not excluded that the PVC of the wear layer may be applied in liquid form or as a paste, after which it is solidified or gelled on the print.

The present invention is in no way limited to the embodiments described herein above; on the contrary, such floor panels or wall-to-wall floor coverings and methods for manufacturing them can be realized according to various variants, without leaving the scope of the present invention.

What is claimed is:

1. A method for manufacturing a floor panel having a substrate and a top layer, the top layer having a decorative layer that includes a digital print and a transparent or translucent wear layer, the method comprising:
 providing the substrate with the digital print by jetting one or more inks from a set of inks using a digital inkjet printer;
 wherein the ink includes a binding agent and/or wherein a primer or adhesion layer is provided between the digital print and the transparent or translucent wear layer;
 wherein the digital print is performed directly on the substrate;
 providing the transparent or translucent wear layer; and
 laminating the transparent or translucent wear layer on top of the printed substrate.

2. The method of claim 1, wherein the digital print is performed directly with the intermediary of a preparative layer.

3. The method of claim 1, wherein the substrate substantially consists of synthetic material and/or filler material.

4. The method of claim 1, wherein the substrate is a PVC-containing substrate.

5. The method of claim 1, wherein the substrate is composed of a thermoplastic material.

6. The method of claim 1, wherein the transparent or translucent wear layer is made of a thermoplastic material.

7. The method of claim 6, wherein the thermoplastic material is PVC.

8. The method of claim 6, wherein the transparent or translucent wear layer has a thickness of 150 micrometers or more.

9. The method of claim 1, wherein the primer or adhesion layer comprises a binder or binding agent.

10. The method of claim 9, wherein said additional binder or binding agent of the primer or adhesion layer is the same as the binding agent contained in the ink.

11. The method of claim 1, wherein the binding agent comprises VC-VAC copolymer or polymer latexes, either acrylates or urethane components.

12. The method of claim 1, wherein the binding agent is present in an amount below 20 percent by weight of the ink.

13. The method of claim 12, wherein the binding agent is present in an amount of at least 2 percent by weight of the ink.

14. The method of claim 1, wherein the set of inks comprises solvent based inks, UV based inks, or water-based inks.

15. The method of claim 1, wherein the inks in the set of inks comprise pigments.

16. The method of claim 1, wherein the set of inks is CMYK.

17. The method of claim 1, wherein the primer or adhesion layer is applied using a roller or a printhead.

18. The method of claim 1, comprising:
 providing a lacquer layer as a liquid layer on the transparent or translucent wear layer and/or the decorative layer; and
 subsequently solidifying the lacquer layer.

* * * * *